United States Patent
Achter et al.

(10) Patent No.: US 9,509,734 B2
(45) Date of Patent: Nov. 29, 2016

(54) DATA GROUP PAGING SERVICE

(75) Inventors: Johannes Achter, Korneuburg (AT); Kurt Bischinger, Vienna (AT)

(73) Assignee: T-MOBILE INTERNATIONAL AG & CO. KG, Bonn (DE)

(*) Notice: Subject to any disclaimer, the term of this patent is extended or adjusted under 35 U.S.C. 154(b) by 1665 days.

(21) Appl. No.: 11/856,634

(22) Filed: Sep. 17, 2007

(65) Prior Publication Data

US 2008/0057928 A1  Mar. 6, 2008

Related U.S. Application Data

(63) Continuation-in-part of application No. PCT/EP2006/002310, filed on Mar. 14, 2006.

(30) Foreign Application Priority Data

Mar. 21, 2005 (DE) .......... 10 2005 013 455
Aug. 24, 2005 (DE) .......... 10 2005 040 280

(51) Int. Cl.
*G06F 15/16* (2006.01)
*H04B 7/00* (2006.01)
(Continued)

(52) U.S. Cl.
CPC ....... *H04L 65/4038* (2013.01); *H04L 12/1818* (2013.01); *H04L 29/06027* (2013.01);
(Continued)

(58) Field of Classification Search
CPC ... H04M 3/42; H04M 11/00; H04L 65/4038; H04L 12/1818; H04L 12/189; H04L 29/06027; H04L 65/1006; H04L 65/4076; H04L 65/1069; H04L 65/1083
USPC ....... 709/227; 455/518, 519, 416; 379/88.17
See application file for complete search history.

(56) References Cited

U.S. PATENT DOCUMENTS 6,647,020 B1 * 11/2003 Maher ................ H04L 12/1818
370/390
6,930,994 B1   8/2005 Stubbs
(Continued)

FOREIGN PATENT DOCUMENTS

WO    2004107719 A1   12/2004

OTHER PUBLICATIONS

3GPP TS 22.250 version 6.0.0 (Release 6) [online], Dec. 2002, whole document, [retrieved on Jan. 29, 2011]. Retrieved from the Internet<URL:http://www.3gpp.org/ftp/specs/html-info/22250.htm>.*

(Continued)

*Primary Examiner* — Philip Chea
*Assistant Examiner* — Wing Ma
(74) *Attorney, Agent, or Firm* — The Maxham Firm

(57) ABSTRACT

A method for setting-up a data connection during a group voice service between several group members as a user of a mobile communication network. In a first method, functions of an IP multimedia subsystem (IMS) are used and a session initiation protocol (SIP) and a controlled data connection between an emitter, a terminal and one or several receivers is produced. Each user is allocated to a group voice service identity (VGCS-ID) an IMS group identity (IMS group ID) and is routed to an application server in the IMS with the aid of the user. A data group voice service is developed between the users. In a second method, each user is routed to the service nodes via GPRS using a group voice service identity (VGCS-ID) and an IP address of a service node, which acts as a relay and a data group voice service is carried out between the users.

17 Claims, 2 Drawing Sheets thick lines: —— user traffic
thin lines: —— signaling traffic
double lines: ══ novel components

(51) Int. Cl.
  *H04M 3/42* (2006.01)
  *H04M 1/64* (2006.01)
  *H04L 29/06* (2006.01)
  *H04L 12/18* (2006.01)

(52) U.S. Cl.
  CPC ....... *H04L 65/1006* (2013.01); *H04L 65/1069* (2013.01); *H04L 65/1083* (2013.01); *H04L 65/4076* (2013.01); *H04L 12/189* (2013.01)

(56) References Cited

U.S. PATENT DOCUMENTS

| | | | |
|---|---|---|---|
| 7,391,724 B2* | 6/2008 | Alakoski et al. | 370/230 |
| 7,408,890 B1* | 8/2008 | Doran et al. | 370/261 |
| 7,415,099 B2* | 8/2008 | Qian | H04L 63/00 379/32.01 |
| 7,460,875 B2* | 12/2008 | Brass | H04W 72/005 455/412.1 |
| 7,466,825 B2* | 12/2008 | Mousseau | 380/270 |
| 7,751,358 B2* | 7/2010 | Kuure et al. | 370/312 |
| 2002/0150091 A1* | 10/2002 | Lopponen et al. | 370/389 |
| 2003/0017836 A1* | 1/2003 | Vishwanathan et al. | 455/517 |
| 2003/0083086 A1* | 5/2003 | Toyryla | H04W 4/08 455/518 |
| 2003/0186716 A1* | 10/2003 | Dorenbosch | H04W 72/005 455/519 |
| 2003/0235184 A1* | 12/2003 | Dorenbosch | H04L 29/06 370/352 |
| 2004/0057405 A1* | 3/2004 | Black | 370/335 |
| 2004/0249949 A1* | 12/2004 | Gourraud | H04W 4/10 709/227 |
| 2005/0041617 A1 | 2/2005 | Huotari et al. | |
| 2005/0190740 A1* | 9/2005 | Zhao et al. | 370/349 |
| 2005/0192041 A1* | 9/2005 | Oxley et al. | 455/519 |
| 2005/0232406 A1* | 10/2005 | Kauppinen | H04W 4/08 379/202.01 |
| 2005/0265313 A1* | 12/2005 | Poikselka | 370/352 |
| 2005/0266869 A1* | 12/2005 | Jung | H04W 4/10 455/518 |
| 2005/0267969 A1* | 12/2005 | Poikselka | H04L 65/4061 709/225 |
| 2006/0031294 A1* | 2/2006 | Poikselka | 709/204 |
| 2006/0035637 A1* | 2/2006 | Westman | 455/435.3 |
| 2006/0046758 A1* | 3/2006 | Emami-Nouri | H04W 4/10 455/518 |
| 2006/0053208 A1* | 3/2006 | Laurila | H04W 4/08 709/206 |
| 2006/0053225 A1* | 3/2006 | Poikselka et al. | 709/227 |
| 2006/0080407 A1* | 4/2006 | Rengaraju | 709/219 |
| 2006/0111135 A1* | 5/2006 | Gray | H04W 4/08 455/519 |
| 2006/0171351 A1* | 8/2006 | Wild | H04M 3/42221 370/328 |
| 2007/0220005 A1* | 9/2007 | Castro Castro | H04W 4/08 |
| 2008/0239996 A1* | 10/2008 | Lohmar et al. | 370/261 |
| 2009/0274090 A1* | 11/2009 | Akhtar | H04L 65/4061 370/328 |
| 2009/0303909 A1* | 12/2009 | Farhoudi et al. | 370/312 |
| 2010/0248772 A1* | 9/2010 | Denman | H04W 4/08 455/518 |

OTHER PUBLICATIONS

3GPP TS 43.068 version 6.3.0 (Release 6) [online], Jan. 2005, whole document, [retrieved on Jan. 29, 2011]. Retrieved from the Internet<URL:http://www.3gpp.org/ftp/specs/html-info/43068.htm>.*

Push to Talk over Cellular Requirements [online], Feb. 2004, whole document, [retrieved on Jan. 29, 2011]. Retrieved from the Internet:<URL:http://member.openmobilealliance.org/ftp/Public_documents/REQ/Permanent_documents/>.*

International Search Report, dated Jul. 6, 2006.

* cited by examiner

DATA GROUP PAGING SERVICE

FIELD OF THE INVENTION

The invention relates generally to a Data Group Call or Paging Service, and in particular, to methods and devices for implementing this type of Data Group Call Service.

DISCUSSION OF PRIOR ART

The known Voice Group Call Service (VGCS) described, for example, in the 3GPP specification TS 43.068, provides for the definition of groups of common downlink and uplink channels. A member (user) of the group can speak while all others listen. If another user wants to speak, that person must request that the voice channel be released. In addition, the role of a dispatcher is defined as one who can speak at any time. If a user happens to speak at the same time, the speech is mixed and heard by all other users as mixed.

The expansion of the known VGCS to cover a transmission of data, that is, the distribution of data within a predefined group, has not previously been provided or defined, either in parallel to an existing group call or independently thereof.

SUMMARY OF THE INVENTION

A purpose of the present invention is to provide methods and devices which allow for a transmission of data, for example, image data, in a Group Call Service.

According to embodiments of the invention, methods and devices are described which implement a data group call in GSM or UMTS networks comprising data transmission functionality in combination with Voice Group Calls (VGCS: Voice Group Call Service).

According to a first embodiment of the invention, a method is provided for setting up a data connection in a Group Call Service between multiple group members as users of a mobile communication network in which functions of an IP Multimedia Subsystem (IMS) are utilized, wherein a data connection controlled by a Session Initiation Protocol (SIP) is established between a sender, a terminal, and one or more recipients. In this method, in addition to a Group Call Service identity (VGCS-ID) an IMS group identity (IMS Group ID) is assigned to each user, with the aid of which the user is routed to an Application Server within the IMS which handles a Data Group Call Service between the users.

According to a second embodiment, a method is provided for setting up a data connection in a Group Call Service between multiple group members as users of a mobile communication network in which each user using a Group Call Service identity (VGCS-ID) and an IP address of a Service Node, is routed through GPRS to the Service Node which acts as a relay and handles a Data Group Call Service between the users.

BRIEF DESCRIPTION OF THE DRAWING

The features, objects, advantages, and applications of the invention will become more evident from the following detailed description, when read in conjunction with the accompanying drawing, in which.

DETAILED DESCRIPTION OF THE PREFERRED EMBODIMENTS

Figure 1:
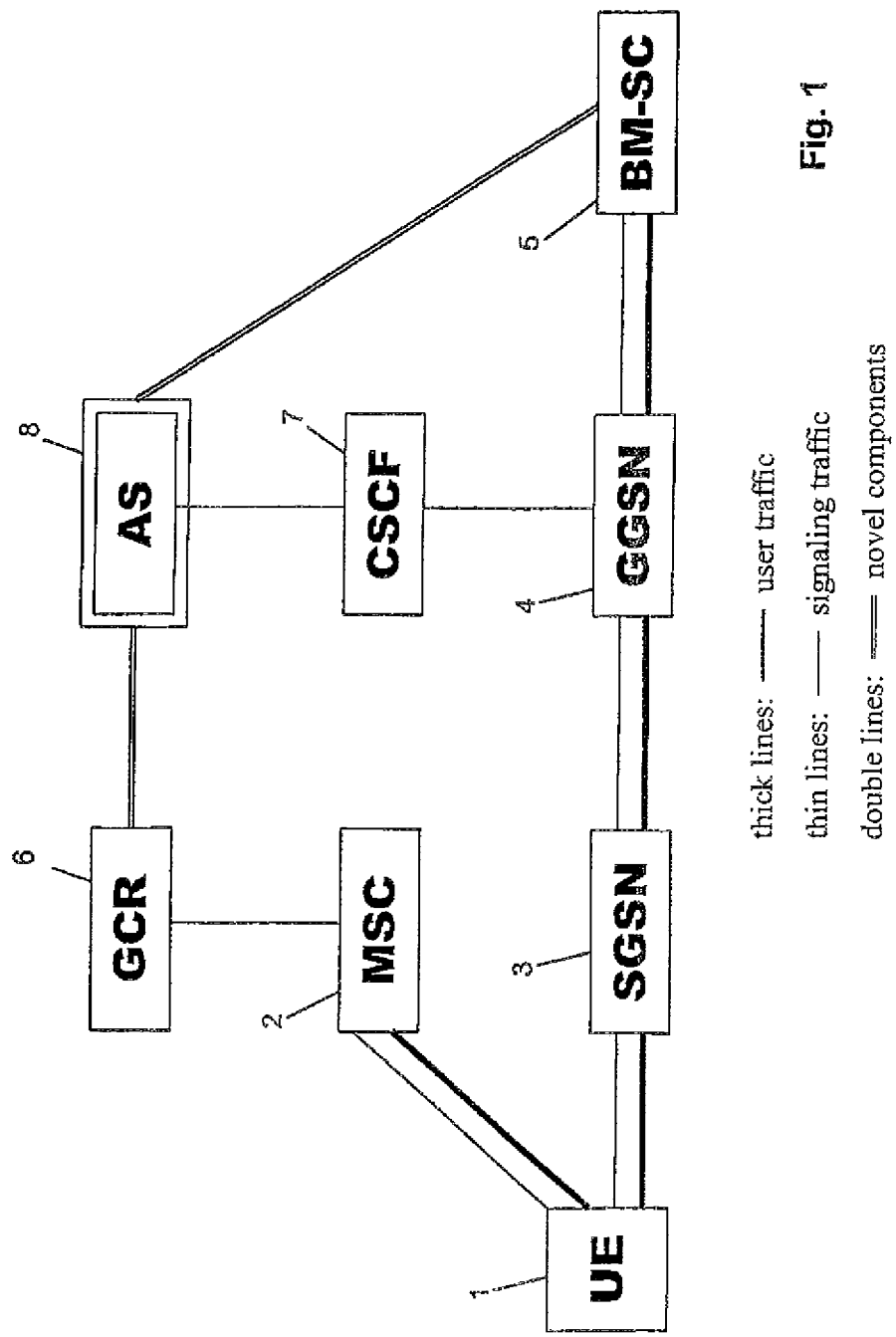
FIG. 1 shows a simplified architecture in block diagram form of a first embodiment of the invention of a Data Group Call Service based on an IP Multimedia Core Network Subsystem and a Multimedia Broadcast Multicast Service (MBMS)

According to the invention, a Data Group Call Service can be realized in connection with a Voice Group Call (VGC)—irrespective of whether or not this even exists.

The transmission of data from terminal (UE) 1 of a user to Broadcast/Multicast-Service Center (BM-SC) 5, and subsequently to terminals of one or more recipients, is effected in a packet-oriented manner through components of a GPRS network A Serving GPRS Support Node (SGSN) 3 controls the data traffic from the terminal through radio base stations BTS/BSC (not shown) and vice versa, and handles the routing of data packets, the management of logical links, and authentication functions.

Gateway GPRS Support Node (GGSN) 4 is the connection unit to the connected networks. GGSN 4 here handles the conversion of the packet formats and the translation of addresses between data networks and the mobile cellular radio network. Mobile switching center (MSC) 2 is used exclusively to handle the VGCS. In the drawing, those user traffic interfaces are shown with thick connecting lines through which the payload data are transmitted, thin connecting lines indicate lines through which signaling traffic is transmitted, while those interfaces or devices are shown with double thin connecting lines which are installed as novel according to the invention.

The Multimedia Broadcast Multicast Service (MBMS) is an expansion of the UMTS network for multimedia and broadcast services which are aimed at optimizing data transmission given simultaneous transmission by many users. MBMS operates with the microcell structure of the UMTS network and is promoted by 3 GPP for standardization.

First Variant—IMS, FIG. 1

For purposes of implementation, use is made here of an IP Multimedia Core Network Subsystem (IMS) (3GPP TS 22.228). IP Multimedia Subsystems (IMS) are central integration platforms for controlling mobile cellular radio services, customer management, and accounting for mobile cellular radio services which are based on the IP protocol.

According to the invention, a data connection controlled by an SIP (Session Initiation Protocol) is established between the sender, terminal 1, and the recipients. The Session Initiation Protocol (SIP) is a standard for a signaling protocol which is able to set up, modify, and terminate sessions between two or more subscribers. This text-oriented protocol, which is based on HTTP, functions to transmit real-time data through packet-supported networks. The SIP protocol is functionally equivalent to the H.323 protocol and can transmit interactive communication services including voice over IP (VOIP) networks. The SIP information can be transported by the TCP protocol or the UDP protocol. SIP has an open internet-based structure and provides for CLASS features (Custom Local Signaling Service), for example, the transmission of the identity of the caller or call forwarding in IP-based networks.

In addition to a Group Call Service identity (VGCS-ID), the user is also assigned a newly introduced IMS group identity (IMS Group ID) which is stored on the SIM card or UICC of the user and is provided to the terminal client. As soon as the user activates an VGCS-ID of the VGCS (this is the instant from which the user receives notifications of the corresponding group, or can establish the Group Call themselves), the client checks on the terminal whether an IMS Group ID is also available for this VGCS-ID. If an IMS Group ID is available, the IMS client registers on the terminal with the aid of the IMS Group ID. Based on this IMS Group ID, the user is routed to a special Application Server (AS) 8 in the IMS which is responsible for handling the Data Group Calls.

With the aid of mechanisms provided in the IMS, Application Server 8 establishes the connection to all group members, and optionally ensures that only one group member is able to upload data, while all others receive this data. The ability of a user to transmit is correspondingly signaled to the client and displayed on the terminal of the user. The request to transmit is sent by the client to the Application Server by means of an SIP message.

In addition, in a manner analogous to a VGCS, a predefined dispatcher can dispatch data to all group members in parallel to a user.

The data downlink is effected either through dedicated channels (point-to-point connections) or by utilizing the MBMS (Multimedia Broadcast Multicast Service, 3GPP TS 22.146). In this last case, the Application Server must establish a connection to Broadcast/Multicast Service Center (BM-SC) 5 from where the data is further distributed to the individual users in a multicast mode.

Correct reception of the data can be confirmed by the individual clients through acknowledgments.

Application Server 8 accesses the data of the Group Call Register (GCR) 6 in order to receive the required information to set up the data group call. Both functions can also be implemented in common.

In addition, an interface is required between BM-SC 5 and GCR 6 or Application Server 8 in order to transfer the data necessary data for a multicast operation.

Figure 2:
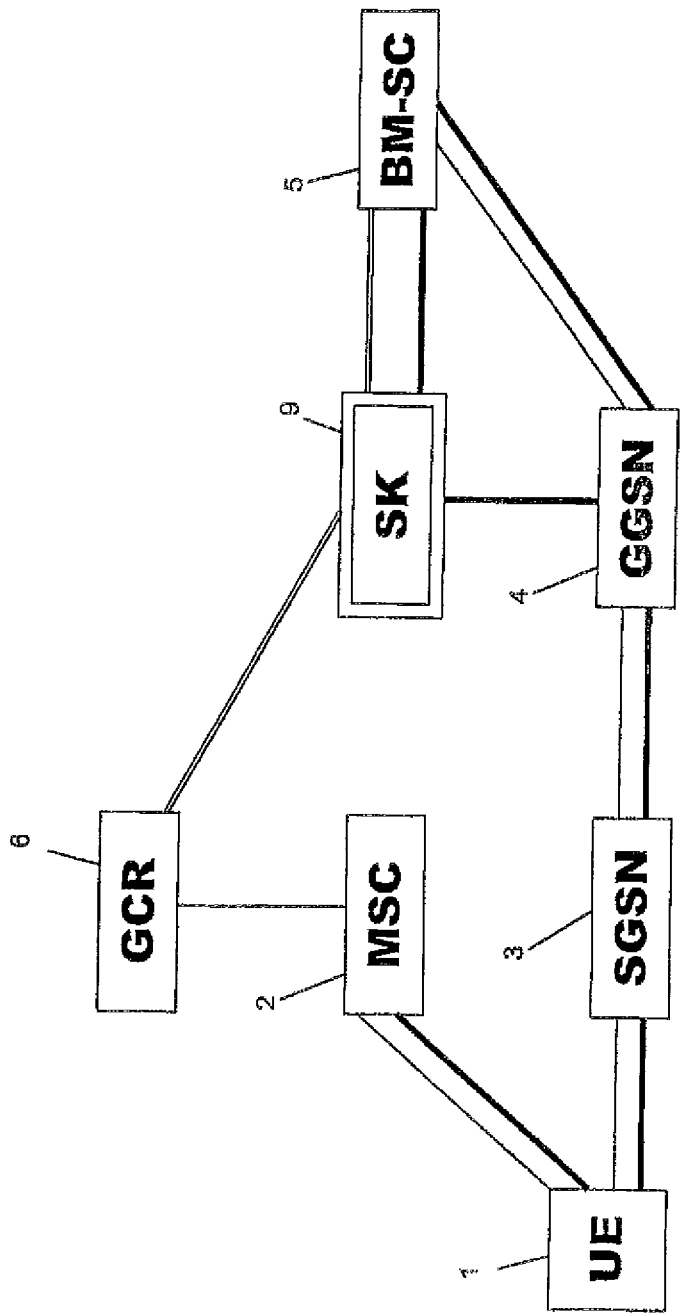
FIG. 2 shows a simplified architecture in block diagram form of a second embodiment of the Data Group Call Service, based on a Service Node (SK) and an MBMS.

Second Variant—Service Node (SK), FIG. 2

Instead of an SIP-controlled direct data connection, according to the first variant, the data of the transmitter, terminal (UE) 1, are sent to a Service Node (SK) 9 which acts as a relay and forwards the data to all recipients.

The user must administer an IP address for the Service Node in addition to the Group ID for the VGC. This is stored on the SIM or UICC and is available to the terminal client. As soon as the user activates a group ID of the VGCS (this is the instant from which the user receives notifications of the corresponding group, or can establish the Group Call themselves), the client checks on the terminal whether a Service Node IP address is also available for this group ID. If yes, GPRS is activated in the terminal—it goes online.

Whenever the user sends data, these are routed in common with the group ID through an SGSN 3 and GGSN 4 to the predefined IP address, behind which Service Node 9 is hidden. A separate APN (Access Point Name) can also optionally be used for this purpose. Based on the originator IP address or the sender IMSI, as well as on the group ID, Service Node 9 checks the authentication and forwards the data to the recipients (that is, the rest of the group members). The Service Node receives the required data (authentications, group members) from Group Call Register (GCR) 6. An interface is required for this purpose between GCR 6 and Service Node 9. Common implementation of GCR 6 and Service Node 9 is also possible.

In addition, in a manner analogous to a VGCS, a predefined dispatcher can dispatch user data in parallel to all group members.

It is not necessary for Service Node 9 to wait until all transmission data has been received before the node forwards this to the recipients. A conventional router response is sufficient.

Since there are no signaling messages here to control the session, special mechanisms must be utilized in order, if desired, to implement a sequential control. For example, control by means of what are known as tokens is conceivable. A client, terminal 1, which wants to obtain the right to send, sends a certain data set to Service Node 9, whereupon the node responds with a certain data set, the token. As a result, the sender, terminal 1, knows that they can only send. Upon completion, the client once again sends the token to Service Node 9 and this node can now forward the token to someone else. This can occur based on buffered request or, on the other hand, based on the first received request after retrieving the token.

The distribution of data from Service Node 9 to the recipients is effected through point-to-point connections, or optionally through an MBMS system. For this purpose, Service Node 9 must forward data to BM-SC 5. A connection between GCR 6 and BM-SC 5 provides data matching, and thus dispatching to the corresponding group. This connection can also be effected through Service Node 9.

Universally Applicable Options

The sequential control for the data connection is optional and can be effected independently of the sequential control of the VGCS.

The option exists of limiting the data volume to be sent or restricting the transmission in regard to time. That is, when the maximum volume of the maximum time has been reached, the sender looses the right to send which can then be assigned to another user.

The above embodiments serve to illuminate the inventive concepts. Modifications and alternatives are likely to occur to those skilled in this technical field which are within the scope of the appended claims which, together with reasonable equivalents, define the invention.

What is claimed is:

1. A method for setting up a data connection in a Group Call Service between multiple group members of a voice call group as users of a mobile communication network, the method comprising:
    employing an application server or a service node to establish a data connection controlled by a Session Initiation Protocol (SIP) between a sender and one or more user members of the voice call group;
    assigning to each user member of the voice call group a Voice Group Call Service identity (VGCS-ID);
    additionally assigning to one or more user members of the voice call group an IMS group identity (IMS Group ID);
    upon a said user member activating the VGCS-ID, using the assigned IMS Group ID to check whether the assigned IMS Group ID is available for the activated VGCS-ID;
    when said check determines that the assigned IMS Group ID is available for the activated VGCS-ID, registering said user member with the aid of the assigned IMS Group ID; and
    routing data from the sender with the aid of the IMS group identity, to an Application Server within an IP Multimedia Subsystem (IMS) which handles a Data Group Call Service between the sender and the user members.

2. The method according to claim 1, wherein the Application Server establishes a connection to all group members with the aid of the mechanisms provided in the IMS, and ensures that it is always only one group member who can upload data, while all other group members receive this data.

3. The method according to claim 1, and further comprising transmitting by a client of a terminal of the network, by means of an SIP message to the Application Server, a request from a user to send.

4. The method according to claim 2, and further comprising transmitting by a client of a terminal of the network, by means of an SIP message to the Application Server, a request from a user to send.

5. The method according to claim 1, wherein the Application Server accesses data of a Group Call Register (GCR) in order to obtain information to set up the Data Group Call.

6. The method according to claim 2, wherein the Application Server accesses data of a Group Call Register in order to obtain information to set up the Data Group Call.

7. The method according to claim 1, wherein the transmission of the data to the user members is accomplished over GPRS channels in the form of point-to-point connections.

8. The method according to claim 1, wherein the transmission of the data to the user members is accomplished by utilizing a Multimedia Broadcast Multicast System.

9. The method according to claim 8, wherein the Application Server establishes a connection to the Broadcast Multicast Service Center (BM-SC) from where the data are further distributed in a multicast mode to the individual user members.

10. The method according to claim 9, wherein the Application Server accesses data of a Group Call Register (GCR) in order to obtain information to set up the Data Group Call, and further comprising transmitting the information for a multicast mode through an interface between the BM-SC and the GCR or the Application Server.

11. A system for setting up a data connection in a Group Call Service between multiple group members of a voice call group as users of a mobile communication network, the system comprising:
an IP Multimedia Subsystem (IMS);
an application server or a service node for establishing a data connection controlled by a Session Initiation Protocol (SIP) between a sender and one or more user members of the voice call group;
a user terminal storing an IMS group identity (IMS Group-ID) assigned to a user member of the voice call group and a Voice Group Call Service Identity (VGCS-ID) assigned to each user member of the voice call group;
wherein the user terminal can be used to activate the VGCS-ID and to use the assigned IMS Group ID to check whether the assigned IMS Group ID is available for the activated VGCS-ID and, when the assigned IMS Group ID is available for the activated VGCS-ID, to register said user member with the aid of the assigned IMS Group ID; and
an Application Server in the IMS to handle a Data Group Call Service between the users, wherein data from the sender is routed with the aid of the assigned IMS Group ID to an Application Server within the IMS which handles a Data Group Call Service between the sender and the user members.

12. A non-transitory computer readable storage medium for use with a computer in a system for setting up a data connection in a Group Call Service between multiple group members of a voice call group as users of a mobile communication network, wherein the computer readable storage medium contains computer executable program instructions for causing the computer to implement the steps of:
establishing a data connection controlled by a Session Initiation Protocol (SIP) between a sender and one or more user members of the voice call group;
assigning to each user member of the voice call group, a Voice Group Call Service identity (VGCS-ID);
additionally assigning to one or more user members of the voice call group an IMS group identity (IMS Group ID);
upon a said user member activating the VGCS-ID, using the assigned IMS Group ID to check whether the assigned IMS Group ID is available for the activated VGCS-ID;
when said check determines that the assigned IMS Group ID is available for the activated VGCS-ID, registering said user member with the aid of the assigned IMS Group ID; and
routing data from the sender with the aid of the IMS group identity, to an Application Server within an IP Multimedia Subsystem (IMS) which handles a Data Group Call Service between the sender and the user members.

13. A method for setting up a data connection in a Group Call Service between multiple group members of a voice call group as users of a mobile communication network, the method comprising:
employing an application server or a service node to establish a data connection between a sender and one or more user members of the voice call group;
assigning to each user member of a voice call group a routing identifier including a Voice Group Call Service identity (VGCS-ID);
additionally assigning to one or more user members of the voice call group an IMS group identity (IMS Group ID);
upon a said user member activating the VGCS-ID, using the IMS Group ID assigned to said user member to check whether the assigned IMS Group ID is available for the activated VGCS-ID, and when the assigned IMS Group ID is available for the activated VGCS-ID, registering said user member with the aid of the assigned IMS Group ID; and
routing data from the sender with the aid of the routing identifier, to a service node or an application server connected to the mobile communication network which handles a Data Group Call Service between the sender and the user members.

14. A system for setting up a data connection in a Group Call Service between multiple group members of a voice call group as users of a mobile communication network, the system comprising:
an application server or a service node for establishing a data connection between users identified as a sender and at least one user member of the voice call group;
a user terminal storing a routing identifier including a Voice Group (Call Service Identity (VGCS-ID) assigned to each member of the voice call group and an IMS group identity assigned to a user member of a voice call group;
wherein the user terminal can be used to activate the VGCS-ID and to use the assigned IMS Group ID to check whether the assigned IMS Group ID is available for the activated VGCS-ID and, when the assigned IMS Group ID is available for the activated VGCS-ID, to register said user member with the aid of the assigned IMS Group ID; and a Serving GPRS Support Node (SGSN) and a Gateway GPRS Support Node (GGSN) for routing data from the sender, using the routing identifier, to a service node or to an application server connected to the mobile communication network which handles a Data Group Call Service between the sender and the user members.

15. The method according to claim 1, further comprising using the assigned IMS Group ID to route the user member to an Application Server in an IP Multimedia Subsystem (IMS) which is responsible for handling the Data Group Calls.

16. The method according to claim 13, further comprising using the assigned IMS Group ID to route the user member to an Application Server in an IP Multimedia Subsystem (IMS) which is responsible for handling the Data Group Calls.

17. A non-transitory computer readable storage medium for use with a computer in a system for setting up a data connection in a Group Call Service between multiple group members of a voice call group as users of a mobile communication network, wherein the computer readable storage medium contains computer executable program instructions for causing the computer to implement the steps of:

establishing a data connection between a sender and one or more user members of the voice call group;

assigning to each user member of a voice call group a routing identifier including a Voice Group Call Service identity (VGCS-ID);

additionally assigning to one or more user members of the voice call group an IMS group identity (IMS Group ID);

upon a said user member activating the VGCS-ID, using the assigned IMS Group ID to check whether the assigned IMS Group ID is available for the activated VGCS-ID and when the assigned IMS Group ID is available for the activated VGCS-ID, registering said user member with the aid of the assigned IMS Group ID; and routing data from the sender with the aid of the routing identifier, to service node or an application server connected to the mobile communication network which handles a Data Group Call Service between the sender and the user members.

* * * * *